US008658238B2

(12) United States Patent  (10) Patent No.: US 8,658,238 B2
Bellody, Jr. et al.  (45) Date of Patent: Feb. 25, 2014

(54) INDULGENT EDIBLE COMPOSITION

(75) Inventors: William J. Bellody, Jr., Hackettstown, NJ (US); Arun V. Shastry, Brentwood, TN (US); Jennifer Tomasso, Flanders, NJ (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 13/562,510

(22) Filed: Jul. 31, 2012

(65) Prior Publication Data

US 2012/0315367 A1  Dec. 13, 2012

Related U.S. Application Data

(62) Division of application No. 11/769,562, filed on Jun. 27, 2007, now Pat. No. 8,263,168.

(60) Provisional application No. 60/817,038, filed on Jun. 27, 2006.

(51) Int. Cl.
*A23G 3/00* (2006.01)

(52) U.S. Cl.
USPC ...................................................... 426/660

(58) Field of Classification Search
USPC ...................................................... 426/660
See application file for complete search history.

(56) References Cited

U.S. PATENT DOCUMENTS

| 5,120,566 A | 6/1992 | Baba et al. |
| 5,185,175 A | 2/1993 | Loh et al. |
| 5,360,621 A | 11/1994 | Mentink et al. |
| 5,409,719 A | 4/1995 | Cain et al. |
| 5,425,957 A | 6/1995 | Gaim-Marsoner et al. |
| 5,532,022 A | 7/1996 | Miller et al. |
| 5,965,179 A | 10/1999 | Ducret et al. |
| 6,010,735 A | 1/2000 | Frippiat et al. |
| 6,165,540 A | 12/2000 | Traitler et al. |
| 6,251,448 B1 | 6/2001 | DeStephen et al. |
| 6,773,744 B1 | 8/2004 | Ward et al. |
| 7,727,574 B1 | 6/2010 | Ushioda et al. |
| 2005/0158447 A1 | 7/2005 | Minamigawa et al. |
| 2006/0121164 A1 | 6/2006 | Hanselmann |
| 2006/0121175 A1 | 6/2006 | Hanselmann |
| 2007/0048431 A1 | 3/2007 | Budwig et al. |
| 2008/0032028 A1 | 2/2008 | Gohil |
| 2009/0285964 A1 | 11/2009 | Shepley et al. |
| 2010/0183795 A1 | 7/2010 | Braun et al. |

FOREIGN PATENT DOCUMENTS

| RU | 5169485 C1 | 6/2001 |
| WO | 2008025803 A1 | 3/2008 |
| WO | 2010146350 A1 | 12/2010 |

OTHER PUBLICATIONS

Csiro, "Water Activity in Food," available at http://www.csiro.au/Outcomes/Food-and-Agriculture/water-activity-in-food.aspx (updated Oct. 14, 2011).
Decision of Granting a Patent for Invention dated Feb. 7, 2011, along with its English translation—19 pages.

*Primary Examiner* — D. Lawrence Tarazano
*Assistant Examiner* — Katherine D LeBlanc
(74) *Attorney, Agent, or Firm* — Mars, Incorporated; Colleen Kramer

(57) ABSTRACT

The present invention is directed to a method of preparing an indulgent edible composition that provides an orally pleasurable eating experience similar to chocolate as the chocolate melts in the oral cavity.

25 Claims, 1 Drawing Sheet

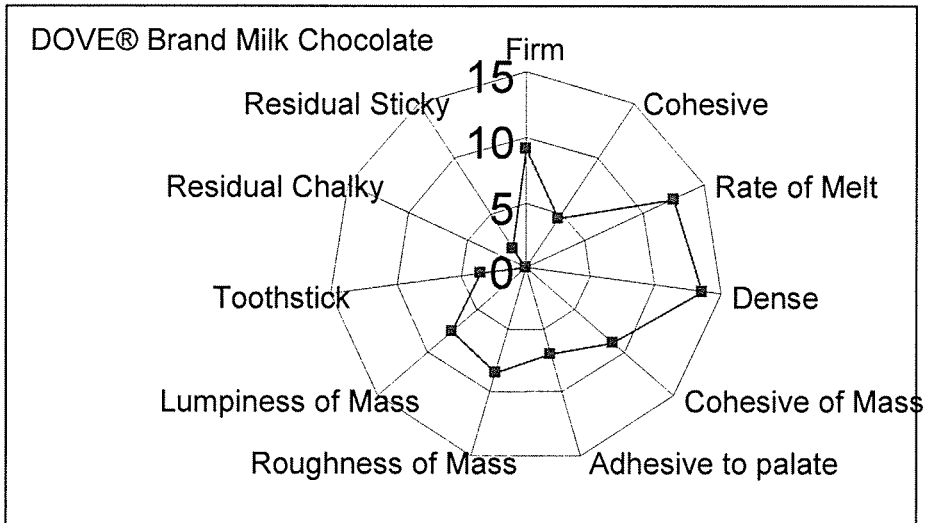
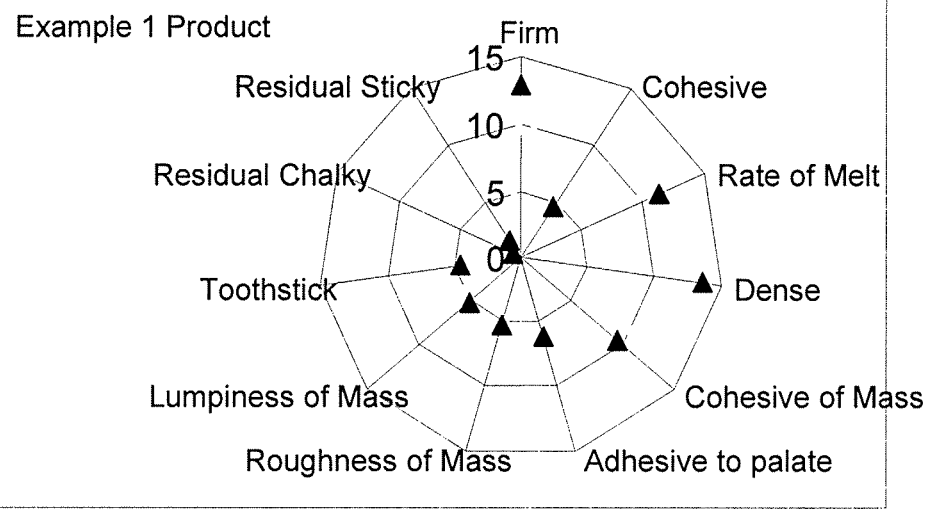
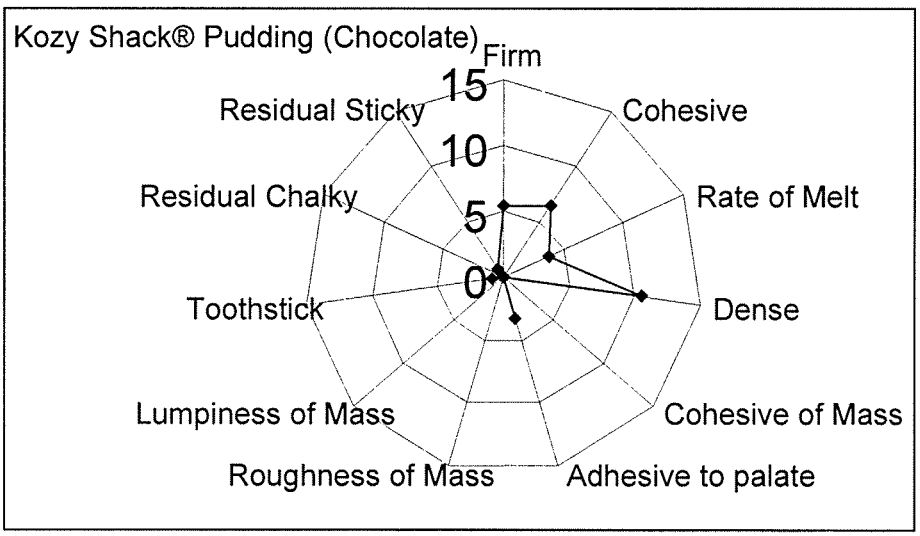

INDULGENT EDIBLE COMPOSITION

This application is a division of application Ser. No. 11/769,562, filed Jun. 27, 2007 now U.S. Pat. No. 8,263,168, which claims the benefit of Provisional Application No. 60/817,038, filed Jun. 27, 2006. The entire contents of these applications are hereby incorporated by reference herein.

BACKGROUND OF THE INVENTION

1. Field of the Invention

The present invention relates to an indulgent edible composition that eats like chocolate at a reduced caloric density and increased moisture content as compared to chocolate. More particularly, the edible composition breaks down, disperses, and spreads like chocolate on the tongue, providing the mouthfeel of chocolate.

2. Description of the Related Art

Eating chocolate is a pleasurable indulgent experience. The taste, texture and even the smell of chocolate create anticipation and excite the senses. In the mouth, the chocolate melts into a rich, smooth, creamy mass full of complex flavor.

However, the feeling of pleasure is accompanied by guilt. For many, chocolate brings to mind calories and fat. The caloric density of chocolate is about 5.2 to about 5.8 kilocalories per gram. This means that small amounts of chocolate are high in calories and fat.

Various attempts to produce reduced-calorie chocolate compositions have resulted in inferior products that fail to deliver the rich, smooth, creamy texture and complex flavor that consumers want.

U.S. Pat. No. 6,773,744 (2004) describes the invention of a low-fat chocolate and chocolate-like product. However, the product defined in this invention is claimed to deliver a short, fudge-type texture. Though the invention describes a product mimicking a chocolate-like eat and rich fat-like texture, the textural attributes are like those for fudge, and the product possesses a high level of sugar crystallization (graining), which results in the short texture associated with fudge. The product and process described in U.S. Pat. No. 6,773,744 also relate to a fairly low water activity and low moisture product. For example, the finished product described in U.S. Pat. No. 6,773,744 possesses a water activity in a range from 0.0 to 0.4 and has a solids content ranging from 80% to 90% by weight.

U.S. Pat. No. 5,360,621 (1994) describes an invention for a low-calorie chocolate containing fat, a sweetening mass, an emulsifier, a dessicated defatted cocoa, and/or a pulverulent milky product. However, this invention relies on the use of sugar replacers (low-calorie saccharide polymers, maltitol and lactitol) to lower the product's caloric count.

U.S. Pat. No. 6,165,540 (2000) and U.S. Pat. No. 6,159,526 (2000) detail the manufacture and specifications for chocolate compositions containing water. These patents relate to a product that contains 1% to 40% by weight water in the final composition by creating a water-in-oil emulsion and then carefully incorporating chocolate into the emulsion so that the emulsion is not destabilized.

U.S. Pat. No. 5,965,179 (1999) relates to a chocolate treated to contain added water by emulsifying/dispersing a thickening or gelling substance such as microcrystalline cellulose in water using an extruder, and mixing and passing a chocolate mass through a nozzle so that the chocolate mass extrudate is maintained at 0-28° C. The patent also describes the use of AVICEL® RC591 F brand cellulose fiber in the aqueous gel introduced into the chocolate.

U.S. Pat. No. 5,425,957 (1995) describes a product and process for producing a sucrose-free (i.e., containing sorbitol, isomalt, lactitol, maltitol, and other sugar alcohols), water-containing milk chocolate with a water content ranging from 2-16%.

U.S. Pat. No. 5,120,566 (1992) describes a process for making a water-containing chocolate. This invention specifically discusses the incorporation of water, liquid sugar, cream, milk, condensed milk, juices, honey, liquors, and mixes thereof into conched chocolate.

U.S. Patent Publication Nos. US2006/0121164 and US2006/0121175 describe the manufacture of oil in water suspensions by forming a gel network with the starches and proteins in cocoa solids to produce standard of identity chocolates having reduced calories. It has been found, however, that gelatinization of chocolate components during cooking may result in a viscous mass that is difficult to work and a product which results in a sour chocolate taste.

The prior art teachings have not succeeded in providing consumers with an indulgent edible product that delivers the pleasurable eating experience of chocolate melting in the mouth, but with less calories. Thus, there is a need for such a product that delivers indulgence without the guilt of having too many calories.

SUMMARY OF THE INVENTION

It is an object of the invention to provide an indulgent edible product by forming a complex matrix of hydrocolloids, water, starch, protein, surfactant, and sweeteners to create a structure that specifically mimics the fat melt experience that occurs in the mouth when eating chocolate.

The present invention is directed to an indulgent edible composition that provides an orally pleasurable eating experience similar to that for chocolate as the chocolate melts in the oral cavity, but at a higher moisture content and a lower caloric density, comprising (a) about 0.25 wt. % to about 4.5 wt. % of a starch that when combined with water in a weight ratio of 5:95 starch to water and cooked for 10 minutes at 100° C., has a viscosity at 22° C. of about 0.03 to about 2 Pascal-seconds (Pa-s) at a shear rate of 10 sec$^{-1}$; (b) about 1.5 wt. % to about 27 wt. % of a protein-containing component that will substantially hydrate in water and will not coagulate; (c) about 2.5 wt. % to about 45 wt. % of a sweetener that when substantially hydrated is at least 90% free of crystals in the edible composition; (d) about 8.5 wt. % to about 54 wt. % of a fat-containing component that melts at a temperature of about 45° C. or less; (e) about 0.10 wt. % to about 4.01 wt. % of a hydrocolloid gelling agent that facilitates the formation of a gel matrix that will break down at a temperature of about 45° C. or less; and (f) about 0.005 wt. % to about 1.35 wt. % of a surfactant that is food-grade and has a HLB (hydrophilic/lipophilic balance) value of from about 0 to about 12, and wherein the edible composition has a final moisture content from about 10% to about 50% moisture, and more preferably 15% to about 50% moisture by weight of the composition.

The present invention is also directed to a method of preparing an indulgent edible composition comprising the steps of (a) mixing a hydrocolloid gelling agent, a starch, a protein-containing component, and water at a temperature of about 5° C. to about 80° C., more preferably about 30° C. to about 80° C., thereby forming a premix; (b) heating the premix and cooking at a temperature of about 60° C. to about 100° C., thereby forming a cooked mass; and (c) adding a surfactant and a fat-containing component to the cooked mass and mixing at low shear and a temperature of about 50° C. to about 85° C. until the fat-containing component is well incorporated into the cooked mass, thereby forming the indulgent edible composition. In addition, a sweetener is added in at least one of steps (a), (b) or (c). In one embodiment the sweetener is added in step (a).

In an alternative embodiment, the method of preparing an indulgent edible composition comprises the steps of (a) forming a slurry with excess water by shearing a fiber-containing component into water in a weight ratio of greater than 10:1 water to fiber until the fiber is dispersed into the water; (b) mixing a starch, a protein-containing component, and a hydrocolloid gelling agent with the slurry containing excess water at a temperature of about 5° C. to about 80° C., more preferably about 30° C. to about 80° C., until the slurry, the starch, the protein-containing component, the sweetener, and the hydrocolloid gelling agent, are uniformly distributed to form a mass; (c) heating and cooking the mass at a temperature of about 60° C. to about 100° C., thereby forming a cooked mass having a total solids content of about 60% to about 75% by weight; and (d) mixing a fat-containing component and a surfactant with the cooked mass, thereby forming the indulgent edible composition. In addition, a sweetener is added in at least one of steps (b), (c) or (d). In one embodiment, the sweetener is added in step (b).

BRIEF DESCRIPTION OF THE DRAWINGS

FIG. 1 is a graphical representation of a textural characterization of the inventive product as compared to DOVE® Brand Milk Chocolate, and KOZY SHACK® Brand Chocolate Flavored Pudding.

DETAILED DESCRIPTION OF THE INVENTION

The term "chocolate" is intended to refer to all chocolate or chocolate-like compositions with a fat-based component phase or fat-like composition. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions which fall outside the specified ranges of the standardized chocolates.

Chocolates also include those containing crumb solids or solids fully or partially made by a crumb process.

Nonstandardized chocolates result when, for example, the nutritive carbohydrate sweetener is replaced partially or completely; or when the cocoa butter, cocoa butter alternative, cocoa butter equivalent, cocoa butter extender, cocoa butter replacer, cocoa butter substitute or milkfat are replaced partially or completely; or when components that have flavors that imitate milk, butter or chocolate are added or other additions or deletions in formula are made outside the FDA standards of identify of chocolate or combinations thereof. Chocolate-like compositions are those fat-based compositions that can be used as substitutes for chocolate in applications such as panning, molding, or enrobing; for example, carob.

The indulgent edible composition of the present invention provides a pleasurable eating experience by simulating the textural attributes of chocolate as the chocolate melts in the mouth and spreads across the tongue. Specifically, the edible composition is a gel matrix that has been formulated to provide a product with a firm texture which will break down and melt when placed in the oral cavity, thus mimicking chocolate as it melts. The indulgent edible composition includes (a) a starch, (b) a protein-containing component, (c) a sweetener, (d) a fat-containing component, (e) a hydrocolloid gelling agent, and (f) a surfactant. In addition, the edible composition has a moisture content of about 10% to about 50%, more preferably about 15% to about 50%, by weight of the composition.

An indulgent edible composition made with this invention was compared to DOVE® Brand Milk Chocolate and to KOZY SHACK® Brand Chocolate Flavored Pudding Snack through descriptive textural analysis, as performed by a trained panel of nine members. The samples were evaluated one at a time (monadic) using the Sensory Spectrum Descriptive Analysis Method and quantified on a 0-15 "world of food" intensity scale.[1] Table 1 summarizes the reference points that were used for this study.

[1] The Sensory Spectrum Descriptive Analysis Method is described in detail in the following reference book: Sensory Evaluation Techniques, 3rd Edition, Morten Meilgaard, D.Sc., Gail Vance Civille, B. S. & B. Thomas Carr, M. S., CRC Press LLC, Boca Raton, Fla., 1999.

TABLE 1

Reference points for textural characterization of food systems as used for descriptive analysis evaluation detailed in FIG. 1.

| Scale | Firmness | Cohesiveness | Rate of Melt | Denseness |
|---|---|---|---|---|
| 0 | | | | |
| 1 | | Gelatin dessert | Whipped topping | Whipped cream |
| 2 | Aerosol whipped cream | | | Marshmallow |
| 3 | | Easy Cheese ®, American | | |
| 4 | | | | Mousse |
| 5 | Salad dressing | | | |
| 6 | | Pudding | | |
| 7 | | | Fleishmann's ® Corn oil Margarine | Fruit yogurt spread |
| 8 | Cheese Whiz | | | |
| 9 | | | Parkay ® Brand Margarine | |

TABLE 1-continued

Reference points for textural characterization of food systems
as used for descriptive analysis evaluation detailed in FIG. 1.

| | | | |
|---|---|---|---|
| 10 | | Baby food | Philadelphia ® whipped cream cheese |
| 11 | Peanut butter | | |
| 12 | | Land O Lakes ® Brand Butter | Breakstone's ® whipped cream cheese |
| 13 | | Tapioca pudding | |
| 14 | Cream cheese | | |
| 15 | | Ice cubes | Philadelphia ® cream cheese |

| Scale | Cohesive of mass | Adhesive to palate | Toothstick | Roughness of Mass |
|---|---|---|---|---|
| 0 | Shoestring licorice | | | |
| 1 | | Hydrogenated vegetable oil | Carrots | |
| 2 | Fresh carrots | | | |
| 3 | | Yellow American Cheese | Mushrooms | American cheese - lumpy |
| 4 | Fresh mushrooms | | | |
| 5 | | | | Graham cracker - grainy |
| 6 | | Marshmallow topping | | |
| 7 | Frankfurter | | Graham crackers | Melba toast - gritty |
| 8 | | Cream Cheese | | |
| 9 | | | Yellow American Cheese | |
| 10 | Yellow American Cheese | | | Pretzel rod - chunks |
| 11 | | | Puffed Cheetos ® snacks | |
| 12 | | Peanut butter | | |
| 13 | | | | |
| 14 | Fig Newtons ® cookies | | | |
| 15 | | | Hard candy | Granola bar - hard pieces |

FIG. 1 shows a chart comparing the findings from this study, which clearly indicate that the inventive product simulated a chocolate eating experience surprisingly well as compared to the KOZY SHACK® Brand Chocolate Flavored Pudding Snack. In particular, the inventive product's attributes such as rate of melt perception, denseness of mass, cohesiveness of mass, adhesion to palate, and firmness were very similar to attributes described for DOVE® Brand Milk Chocolate, enabling the inventive product to deliver an indulgent eating experience similar to that of chocolate. The results show that the inventive product mimics the attributes of chocolate, but is quite different from pudding.

Starch is an essential component of the edible composition. The starch adds texture and body to the composition.

Suitable starches when combined with water in a weight ratio of 5:95 starch to water, respectively, and cooked for 10 minutes at around 100° C. will exhibit a viscosity at 22° C. of about 0.03 to about 2 Pascal-seconds (Pa-s) at a shear rate of 10 sec$^{-1}$. The viscosity measurements are based on measurements taken on a Paar Physica MCR 500 Modular Compact Rheometer using a 5 cm, 1° Cone and Plate configuration.

Starches such as, for example, modified tapioca starch, modified rice starch, modified corn starch, potato starch, specialty starches, and mixtures thereof may be used. Particularly preferred is a modified tapioca starch such as FRIGEX HV®, FRIGEX®, and TEXTRA®, which are available from National Starch and Chemical Company of Bridgewater, N.J., and other specialty starches such as PURITY® brand, CLEARJEL®, and the NOVATION® series (for example, NOVATION® 3300 AND NOVATION® 3600), which are all available from National Starch and Chemical Company of Bridgewater, N.J.

Ideally, the starch is substantially hydrated during processing. The hydration process is dependent upon several factors, which include time, temperature, shear conditions, moisture content, presence of additives or other dissolved components, and the type of starch used.

The amount of starch in the edible composition is from about 0.25 wt. % to about 4.5 wt. % based on the total weight of the edible composition. Preferably, from about 0.35 wt. % to about 4.5 wt. %, more preferably, from about 0.45 wt. % to about 4.5 wt. %, even more preferably, from about 0.55 wt. % to about 3.15 wt. %, still even more preferably, from about 0.65 wt. % to about 2.52 wt. %, and most preferably, from about 0.70 wt. % to about 1.80 wt. % based on the total weight of the edible composition.

On a dry weight basis, the amount of starch in the edible composition is from about 0.50 wt. % to about 5.0 wt. % based on the total dry weight of the edible composition. Preferably, from about 0.70 wt. % to about 5.0 wt. %, more preferably, from about 0.90 wt. % to about 5.0 wt. %, even more preferably, from about 1.10 wt. % to about 3.5 wt. %, still even more preferably, from about 1.3 wt. % to about 2.8 wt. %, and most preferably, from about 1.4 wt. % to about 2.0 wt. % based on the total dry weight of the edible composition.

Another essential component is a protein-containing component, which serves to provide body, flavor and creaminess to the composition. The protein also provides nutrients and can be used as a source of energy. One gram of protein provides about 4 kilocalories of energy. It is important that the protein-containing component must not coagulate during processing, which would interfere with the desired creamy texture. Moreover, the protein-containing component must be capable of substantially hydrating in water. As used herein, a protein-containing component will contain greater than 10%, preferably greater than 20%, and more preferably greater than 30% protein on a dry weight basis.

A variety of dairy and soy proteins may be used in the edible composition.

Suitable protein-containing components include, for example, nonfat dry milk powder, whole milk powder, milk protein concentrate, whey powder, whey protein, whey protein concentrate, whey protein isolate, nut and nut powders (e.g., peanut, almond, walnut, pecans, hazelnut and cashew), casein, sodium caseinate, lactalbumin, egg and egg components (e.g. albumin, whole egg powder and egg concentrate), protein containing grain flours and their protein concentrates and protein isolates (e.g., wheat, millet and corn), soy bean powder and other protein containing vegetables, and their flours, protein concentrates and protein isolates, or mixtures thereof.

The preferred protein source for the edible composition comprises dairy proteins, and most preferably, milk powder and milk protein concentrates.

The amount of protein-containing component in the edible composition is from about 1.5 wt. % to about 27 wt. % based on the total weight of the edible composition. Preferably, from about 2.0 wt. % to about 27 wt. %; more preferably, from about 2.5 wt. % to about 27 wt. %; even more preferably, from about 3.0 wt. % to about 22.5 wt. %; still even more preferably, from about 3.25 wt. % to about 18 wt. %; and most preferably, from about 3.35 wt. % to about 13.5 wt. % based on the total weight of the edible composition.

On a dry weight basis, the amount of protein-containing component in the edible composition is from about 3 wt. % to about 30 wt. % based on the total dry weight of the edible composition. Preferably, from about 4 wt. % to about 30 wt. %, more preferably, from about 5 wt. % to about 30 wt. %, even more preferably, from about 6 wt. % to about 25 wt. %, still even more preferably, from about 6.5 wt. % to about 20 wt. %, and most preferably, from about 6.7 wt. % to about 15 wt. % based on the total dry weight of the edible composition.

A sweetener is also included in the edible composition. Importantly, the sweetener must be at least 90% free of crystals when substantially hydrated in the finished edible composition.

Suitable sweeteners include, but are not limited to, sucrose, glucose, dextrose, maltose, dextrin, invert sugar, fructose, levulose, galactose, lactose, corn syrup, corn syrup solids, saccharin, brown sugar, fruit juice, tagatose, honey, molasses and mixtures thereof.

Additionally, sugarless sweeteners may be used. For example, sugar alcohols such as sorbitol, mannitol, xylitol, erythritol, hydrogenated starch hydrolysates, maltitol, and mixtures thereof are suitable for use in the present invention.

Sugar replacers may also be used as the sweetener in the edible composition. High intensity artificial sweeteners such as, for example, sucralose, aspartame, N-substituted APM derivatives such as neotame, salts of acesulfame, altitame, saccharin and its salts, cyclamic acid and its salts, glycyrrhizinate, dihydrochalcones, thaumatin, monellin, and mixtures thereof.

Preferably, the sweetener used in the edible composition includes sucrose, fructose, glucose, dextrose, maltose, dextrin, invert sugar, levulose, galactose, corn syrup, corn syrup solids, sugar alcohols, sugar replacers, brown sugar, fruit juice, tagatose, honey, molasses or mixtures thereof. Most preferably, the sweetener has at least one of the following: sucrose, lactose, glucose and/or fructose.

The amount of sweetener in the edible composition is from about 2.5 wt. % to about 45 wt. % based on the total weight of the edible composition. Preferably, from about 5 wt. % to about 43.2 wt. %, more preferably, from about 7.5 wt. % to about 41.4 wt. %, even more preferably, from about 10 wt. % to about 39.6 wt. %, still even more preferably, from about 12.5 wt. % to about 37.8 wt. %, and most preferably, from about 15 wt. % to about 36 wt. % based on the total weight of the edible composition.

On a dry weight basis, the amount of sweetener in the edible composition is from about 5 wt. % to about 50 wt. % based on the total dry weight of the edible composition. Preferably, from about 10 wt. % to about 48 wt. %, more preferably, from about 15 wt. % to about 46 wt. %, even more preferably, from about 20 wt. % to about 44 wt. %, still even more preferably, from about 25 wt. % to about 42 wt. %, and most preferably, from about 30 wt. % to about 40 wt. % based on the total dry weight of the edible composition.

In one embodiment, corn syrup and/or corn syrup solids are included in the edible composition to inhibit the formation of sugar crystals. The inclusion of these components is particularly preferred when sucrose is used as a sweetener in the edible composition.

The edible composition also includes a fat-containing component, which conveniently melts at a temperature near body temperature. Thus, the fat will not interfere with the edible composition's mimic of the textural attributes of chocolate, especially the melting characteristics of the chocolate. The fat-containing component is carefully selected so that it melts at a temperature of about 45° C. or less. Preferably, the fat-containing component melts at about 0° C. to about 45° C. More preferably, the fat-containing component melts at about 5° C. to about 40° C. Even more preferably, the fat-containing component melts at about 10° C. to about 35° C. Still more preferably, the fat-containing component melts at about 15° C. to about 30° C. Most preferably, the fat-containing component melts at about 20° C. to about 25° C. As used herein, a fat-containing component contains fat at levels greater than 12% by weight, preferably greater than 20% and more preferably greater than 25% by weight.

When the fat-containing component has no saturated fat or is low in saturated fat, the fat-containing component melts at about 0° C. to about 45° C. More preferably, the fat-containing component melts at about 0° C. to about 40° C. Even more preferably, the fat-containing component melts at about 0° C. to about 35° C. Still more preferably, the fat-containing component melts at about 0° C. to about 30° C. Still more preferably, the fat-containing component melts at about 0° C. to about 25° C. Most preferably, the fat-containing component melts at about 0° C. to about 20° C.

Several fat-containing components that may be used in the edible composition are, for example, chocolate, cocoa butter, chocolate crumb, cocoa butter alternative, cocoa butter equivalent, cocoa butter extender, cocoa butter replacer, cocoa butter substitute, milk fat, cocoa solids, chocolate liquor, compound coating, olestra, vegetable oil, fractionated fat, nut pastes, butters and powders (e.g., peanut, cashew, hazelnut and almond), anhydrous milk fat, butter, lard, tallow, egg yolks, coconut, palm oils and extracts, soy bean oil, avacado oil and grain oils (e.g., rice, bran, corn, and grape seed) and mixtures thereof.

The amount of the fat-containing component in the edible composition is from about 8.5 wt. % to about 54 wt. % based on the total weight of the edible composition. Preferably, from about 10 wt. % to about 54 wt. %; more preferably, from about 12.5 wt. % to about 54 wt. %; even more preferably, from about 15 wt. % to about 49.5 wt. %; still more preferably, from about 16 wt. % to about 46.8 wt. %; and most preferably, from about 17.5 wt. % to about 40.5 wt. % based on the total weight of the edible composition.

On a dry weight basis, the amount of the fat-containing component in the edible composition is from about 17 wt. % to about 60 wt. % based on the total dry weight of the edible composition. Preferably, from about 20 wt. % to about 60 wt. %, more preferably, from about 25 wt. % to about 60 wt. %, even more preferably, from about 30 wt. % to about 55 wt. %, still even more preferably, from about 32 wt. % to about 52 wt. %, and most preferably, from about 35 wt. % to about 45 wt. % based on the total dry weight of the edible composition.

Another essential component is a hydrocolloid gelling agent that facilitates the formation of a gel matrix. The hydrocolloid gelling agent is a key contributor to obtaining the desired fat mimicking character of the edible composition. The gel matrix forms a structure that exhibits solid-like behavior. The hydrocolloid gelling agent is selected so that the gel matrix established by the hydrocolloid gelling agent will break down at a temperature of about 45° C. or less.

Suitable hydrocolloid gelling agents include, for example, low-methoxyl pectin, agar, carrageenan, gum arabic, gelatin, gellan, locust bean gum, guar gum, pectin, xanthan, maltodextrin, gum ghatti, gum karaya, gum tragacanth, dextran, konjac flour, aribinogalactan, gellan gum, furcellaran, alginate, and fractionated portions and mixtures thereof. Preferred hydrocolloid gelling agents are low-methoxyl pectin, depolymerized agar, carageenan, gelatin, and propylene glycol alginate. The most preferred hydrocolloid gelling agents are low methoxyl pectin having a relatively low melt temperature and depolymerized agar, both available from Degussa (a division of Cargill, Inc.). These hydrocolloids have melt profiles similar to gelatin, which melts at body temperature, but unlike the long texture of gelatin, these hydrocolloids provide a desirable short texture.

The amount of the hydrocolloid gelling agent in the edible composition is from about 0.10 wt. % to about 4.01 wt. % based on the total weight of the edible composition. Preferably, from about 0.15 wt. % to about 3.83 wt. %, more preferably, from about 0.2 wt. % to about 3.6 wt. %, even more preferably, from about 0.23 wt. % to about 3.38 wt. %, still even more preferably, from about 0.25 wt. % to about 3.15 wt. %, and most preferably, from about 0.50 wt. % to about 2.25 wt. % based on the total weight of the edible composition.

On a dry weight basis, the amount of the hydrocolloid gelling agent in the edible composition is from about 0.2 wt. % to about 4.45 wt. % based on the total dry weight of the edible composition. Preferably, from about 0.3 wt. % to about 4.25 wt. %, more preferably, from about 0.4 wt. % to about 4 wt. %, even more preferably, from about 0.45 wt. % to about 3.75 wt. %, still even more preferably, from about 0.5 wt. % to about 3.5 wt. %, and most preferably, from about 1 wt. % to about 2.5 wt. % based on the total dry weight of the edible composition.

The edible composition of the present invention also includes an edible surfactant. The surfactant has a HLB (hydrophilic/lipophilic balance) value of about 0 to about 12, preferably, a HLB value of about 2 to about 12. More preferably, a HLB value of about 4 to about 12.

Suitable edible surfactants are, for example, lecithin or other phospholipids, polyglycerol polyricinoleate (PGPR), monoglycerides, diglycerides, sodium steoryl lactylate, citric acid esters of monoglycerides and diglycerides, MYVATEX™ Brand Mighty Cream, acetylated monoglycerides, glycerol monostearate, glycerol triacetate, fatty acids, and mixtures thereof.

A particularly preferred edible surfactant is lecithin. Other edible surfactants may also be used alone or in combination with lecithin.

In a preferred embodiment, the edible surfactant also functions as an emulsifier.

The edible surfactant is present in the edible composition in an amount from about 0.005 wt. % to about 1.35 wt. % based on the total weight of the edible composition. Preferably, from about 0.05 wt. % to about 1.35 wt. %, more preferably, from about 0.06 wt. % to about 1.35 wt. %, even more preferably, from about 0.075 wt. % to about 0.81 wt. %, still even more preferably, from about 0.085 wt. % to about 0.54 wt. %, and most preferably, from about 0.10 wt. % to about 0.45 wt. % based on the total weight of the edible composition.

On a dry weight basis, the amount of surfactant in the edible composition is from about 0.01 wt. % to about 1.5 wt. % based on the total dry weight of the edible composition. Preferably, from about 0.1 wt. % to about 1.5 wt. %, more preferably, from about 0.12 wt. % to about 1.5 wt. %, even more preferably, from about 0.15 wt. % to about 0.9 wt. %, still even more preferably, from about 0.17 wt. % to about 0.60 wt. %, and most preferably, from about 0.20 wt. % to about 0.50 wt. % based on the total dry weight of the edible composition.

Optionally, the edible composition may include a fiber-containing component, which lowers the caloric density of the composition. For example, the edible composition may include cellulose, polydextrose, raftilose, raftilin, fructooligosaccharides (NutraFlora®), palatinose oligosaccharide, guar gum hydrolysate (SunFiber®), dextrin and maltodextrin (Nutriose® Brand, supplied by Roquette), indigestible dextrin (Fibersol®), inulin or mixtures thereof.

The fiber-containing component may be included in the edible composition in an amount from about 0 wt. % to about 9 wt. % based on the total weight of the edible composition. Preferably, from about 0.5 wt. % to about 6.3 wt. %, and more preferably, from about 1 wt. % to about 4.5 wt. % based on the total weight of the edible composition.

On a dry weight basis, the amount of fiber-containing component that may be included in the edible composition is from about 0 wt. % to about 10 wt. % based on the total dry weight of the edible composition. Preferably, from about 1 wt. % to about 7 wt. %, and more preferably, from about 2 wt. % to about 5 wt. % based on the total dry weight of the edible composition.

The edible composition may also comprise micronutrients, nutraceuticals, food-grade additives, preservatives, flavorants, colorants, edible ink printed images, nuts and other food inclusions as optional ingredients to provide further enhancements to the product.

Nutraceuticals are natural, bioactive chemical compounds that have health promoting, disease preventing or medicinal properties. They are often referred to as phytochemicals or functional foods.

A processing aid may also be included. For example, to reduce or prevent excess frothing that may occur during ingredient hydration, anti-foaming agents are employed. Suitable processing aids also include, but are not limited to, propylene glycol alginate, glycerol, propylene glycol, alcohols, simethicon emulsion, and polysorbate.

The total moisture content, i.e., water content, of the edible composition is from about 10 wt. % to about 50 wt. %, preferably from about 12 wt. % to about 46 wt. %, more preferably from about 15 wt. % to about 44 wt. %, even more preferably, from about 17 wt. % to about 42 wt. %, still even more preferably, from about 20 wt. % to about 40 wt. %, and most preferably, from about 27 wt. % to about 38 wt. % based on the total weight of the edible composition.

Conversely, the total solids content of the edible composition is from about 50 wt. % to about 90 wt. %, preferably from about 54 wt. % to about 88 wt. %, more preferably from about 56 wt. % to about 85 wt. %, even more preferably, from about 58 wt. % to about 83 wt. %, still even more preferably, from about 60 wt. % to about 80 wt. %, and most preferably, from about 62 wt. % to about 73 wt. % based on the total weight of the composition.

The edible composition has a water activity, $a_w$, that is below about 0.95. Preferably, the $a_w$ is from about 0.4 to about 0.95, more preferably, from about 0.50 to about 0.94, even more preferably, from about 0.6 to about 0.93, still even more preferably, from about 0.65 to about 0.92, still even more preferably, from about 0.70 to about 0.92, still even more preferably, from about 0.75 to about 0.92, and most preferably, from about 0.78 to about 0.92.

As noted above, the edible composition provides an indulgent pleasurable eating experience similar to chocolate with significantly less calories. Chocolate has a caloric density of about 5.2 to about 5.8 kilocalories per gram. In contrast, the caloric density of the edible composition is less than about 5.0 kilocalories per gram. Preferably, about 2.2 to about 4.5 kilocalories per gram. More preferably, about 2.2 to about 4.0 kilocalories per gram. Most preferably, about 2.4 to about 3.9 kilocalories per gram. This reduction in caloric density as compared to chocolate translates into the significant nutritional benefit of a greatly calorie-reduced yet indulgent snack.

The edible composition may also provide an indulgent eating experience similar to chocolate in a non-chocolate flavor such as caramel or coffee.

The present invention includes a method of preparing an indulgent edible composition. The edible composition is prepared by (a) mixing a hydrocolloid gelling agent, optionally a sweetener, a starch, a protein-containing component, and water at a temperature of about 5° C. to about 80° C., preferably about 30° C. to about 80° C. thereby forming a premix; (b) heating the premix and cooking at a temperature of about 60° C. to about 100° C., thereby forming a cooked mass; and (c) adding a surfactant and a fat-containing component to the cooked mass and mixing at low shear and a temperature of about 50° C. to about 85° C. until the fat-containing component is well incorporated into the cooked mass, thereby forming the indulgent edible composition. While the sweetener in step (a) is indicated as optional, it is important to recognize that a sweetener must be added in at least one of steps (a), (b) or (c). In one embodiment, the sweetener is added in step (a).

In step (a), the premix is formed by mixing a hydrocolloid gelling agent, optionally a sweetener, a starch, a protein-containing component, and water. To facilitate forming the premix, the components are mixed at about 5° C. to about 80° C. Preferably, the premix is mixed at about 30° C. to about 80° C., and more preferably, at about 40° C. to about 60° C.

The premix is then cooked at a temperature of about 60° C. to about 100° C. in step (b). This facilitates the hydration and gelatinization of the starch, and the hydration of the hydrocolloids, sugars and proteins. In order to properly hydrate and gelatinize the starch, the temperature of the cooking process needs to be above 60° C. Preferably, the cooking temperature is from about 65° C. to about 100° C., and most preferably, from about 75° C. to about 100° C.

Next, in step (c), a surfactant and a fat-containing component are added to the cooked mass and mixed at low shear and a temperature of about 50° C. to about 85° C., preferably about 50° C. to about 70° C., and even more preferably about 50° C. to about 60° C., until the fat-containing component is well incorporated into the cooked mass. This step is preferably performed at a temperature warm enough to keep the fat-containing component in a liquid state during mixing with a low shear mixer and to prevent premature setting up of the product. The temperature should be cool enough to avoid fat separation from the mass during mixing. The end result is a smooth and homogeneous indulgent edible composition. It is particularly important to ensure that the fat-containing chocolate components, e.g. cocoa butter, chocolate liquor, cocoa solids and/or chocolate crumb, are added after the cook step (b).

In a preferred embodiment, an excess amount of water (i.e., more water than is present in the finished edible composition) is used to hydrate the starch, protein-containing component, optional sweetener, and hydrocolloid gelling agent. The excess water is later substantially removed after hydration. For example, water may be added and mixed with the premix in step (a) to a level of about 16 wt. % to about 80 wt. % moisture, followed by heating the premix to remove water to achieve a total solids content of about 50 wt. % to about 85 wt. % solids. Preferably, water may be added and mixed with the premix to a level of about 20 wt. % to about 70 wt. % moisture, more preferably about 25 wt. % to about 60 wt. % moisture, and most preferably about 30 wt. % to about 50 wt. % moisture. It is also preferred that the premix be heated to remove water to achieve a total solids content of about 12.85% to about 90.63%, more preferably about 18.05% to about 88.58%, even more preferably about 24.21% to about 85.54%, still more preferably about 29.85% to about 83.49%, still even more preferably about 33.73% to about 80.47%, and most preferably about 38.15% to about 73.40% total solids.

In another preferred embodiment, a fiber dispersion is formed by shearing a fiber-containing component into water until the fiber is dispersed into the water, and the fiber dispersion is then mixed with the hydrocolloid gelling agent, optionally a sweetener, starch, protein-containing component, and water in step (a) to form the premix. The fiber dispersion may be used to provide additional body and further enhance the creamy mouthfeel of the finished edible composition. For example, a dispersion of cellulose, such as microcrystalline cellulose, in water may be used.

In another preferred embodiment, a fiber dispersion in water is prepared and mixed with the hydrocolloid gelling agent, optionally a sweetener, starch, protein-containing component, and an excess amount of water in step (a) and the excess water is later substantially removed after hydration in a combination of the two preferred embodiments described above. In several embodiments, the ratio of water to fiber in the fiber dispersion is greater than 10:1.

In another preferred embodiment where a pressurized cooking system is used to prepare the premix, a temperature greater than about 100° C. may be used to accelerate the hydration and gelatinization of the starch, proteins, sugars and hydrocolloids.

In several preferred embodiments, high shear processing equipment, such as a homogenizer, pin beater, Mondo mixer, or "Shockwave" reactor (developed by Hydrodynamics, Inc.), is used to hydrate and gelatinize the premix components. When using these types of processing equipment, it may be possible to combine the premix components with the surfactant and fat-containing component, and simultaneously cook and process the mixture in a single processing step. In these cases, sufficient mechanical shear is required during processing or post-processing to mix and hydrate all the ingredients to a degree such that a smooth texture is obtained in the finished edible composition. Preferably, little or no excess water is used in processing. However, it is more preferred for the surfactant and fat-containing component to be delivered to the processing system downstream of the cooking step.

In an alternative embodiment, the method of preparing an indulgent edible composition comprises the steps of (a) forming a slurry with an excess amount of water by shearing a fiber-containing component into water in a weight ratio of greater than 10:1 water to fiber until the fiber is dispersed into the water; (b) mixing a starch, a protein-containing component, optional sweetener and a hydrocolloid gelling agent with the slurry containing excess water at a temperature of about 5° C. to about 80° C., preferably, about 30° C. to about 80° C. until the slurry, the starch, the protein-containing component, the optional sweetener, and the hydrocolloid gelling agent are uniformly distributed to form a mass; (c) heating and cooking the mass at a temperature of about 60° C. to about 100° C. to remove the excess water, thereby forming a cooked mass having a total solids content of about 50% to about 85% by weight; and (d) mixing a fat-containing component and a surfactant with the cooked mass at low shear and a temperature of about 50° C. to about 85° C., preferably about 50° C. to about 70° C., and more preferably about 50° C. to about 60° C., thereby forming the indulgent edible composition. The sweetener, while indicated as optional in step (b), must be added in at least one of steps (b), (c) or (d).

The fiber dispersion in water prepared in step (a) may be used to provide additional body and further enhance the creamy mouthfeel of the finished edible composition. For example a dispersion of cellulose, such as microcrystalline cellulose, in water may be used.

In step (b), the mass is formed by mixing a starch, a protein-containing component, an optional sweetener, and a hydrocolloid gelling agent with the slurry containing excess water. To facilitate forming the mass, the components are mixed at about 5° C. to about 80° C. Preferably, the components are mixed at about 30° C. to about 80° C., and more preferably, at about 50° C. to about 60° C.

The mass is then cooked at a temperature of about 60° C. to about 100° C. in step (c) in order to hydrate and gelatinize the starch, and to hydrate the hydrocolloids, sugars and proteins. In order to properly hydrate and gelatinize the starch, the temperature of the cooking process needs to be above 60° C. Preferably, the cooking temperature is from about 65° C. to about 100° C., and most preferably, from about 75° C. to about 100° C. The cooking of the mass also removes any excess water, thereby forming a cooked mass with a total solids content of about 50 wt. % to about 85 wt. % solids. Preferably, the mass is cooked to remove water to achieve a total solids content of about 12.85% to about 90.63%, more preferably about 18.05% to about 88.58%, even more preferably about 24.21% to about 85.54%, still more preferably about 29.85% to about 83.49%, still even more preferably about 33.73% to about 80.47%, and most preferably about 38.15% to about 73.40% total solids.

When there is excess water in the mass, water is removed from the mass to form a cooked mass with the desired total solids content. Conversely, when the total solids content of the mass is higher than desired, water may be added, mixed, and heated with the mass to form a cooked mass with a total solids content of about 50% to about 85% by weight. In a preferred embodiment, the total solids content of the cooked mass is about 12.85% to about 90.63%, more preferably about 18.05% to about 88.58%, even more preferably about 24.21% to about 85.54%, still more preferably about 29.85% to about 83.49%, still even more preferably about 33.73% to about 80.47%, and most preferably about 38.15% to about 73.40% total solids.

Next, in step (d), a surfactant and a fat-containing component are added to the cooked mass and mixed at low shear and a temperature of about 50° C. to about 85° C., preferably about 50° C. to about 70° C., and more preferably about 50° C. to about 60° C., until the fat-containing component is well incorporated into the cooked mass. This step is preferably performed at a temperature warm enough to keep the fat-containing component in a liquid state during mixing with a low shear mixer and to prevent premature setting up of the product. Additionally, the temperature is preferably cool enough to avoid fat separation from the mass during mixing. The end result is the smooth and homogeneous indulgent edible composition.

Irrespective of how the edible composition is made, the ingredients used to make the composition must satisfy the criteria previously discussed. That is, the starch, when combined with water in a weight ratio of 5:95 starch to water and cooked for 10 minutes at 100° C., has a viscosity at 22° C. of about 0.03 to about 2 Pascal-seconds (Pa-s) at a shear rate of 10 sec$^{-1}$ (as measured using a Paar Physica MCR 500 Modular Compact Rheometer using 5 cm, 1° Cone and Plate configuration). The protein-containing component substantially hydrates in water and will not coagulate. The sweetener when substantially hydrated is at least 90% free of crystals in said edible composition. The fat-containing component melts at a temperature of about 45° C. or less. The hydrocolloid gelling agent facilitates the formation of a gel matrix that will break down at a temperature of about 45° C. or less. The surfactant is food-grade and has a HLB value of from about 0 to about 12.

During processing, the starch, the protein-containing component, the sweetener, and the hydrocolloid gelling agent are at least 70% hydrated. Preferably, at least about 80% hydrated, more preferably at least about 90% hydrated, even more preferably at least about 95% hydrated, still even more preferably at least about 98% hydrated, and most preferably the starch, the protein-containing component, the sweetener, and the hydrocolloid gelling agent are hydrated to substantial completion, i.e., fully hydrated. For reference, the term "% hydrated" refers to the extent of hydration as commonly measured in the food industry (such as by microscopic evaluation of hydrated starches to quantify percent hydration).

The starch, protein-containing component, sweetener, and hydrocolloid gelling agent may be hydrated using an excess amount of water. The water remaining after hydration is later substantially removed.

However, it should be understood that in the final product, the starch, the protein-containing component, the sweetener, and the hydrocolloid gelling agent may not be fully hydrated.

The edible composition has a viscosity of about 5 to about 40 Pascal-seconds (Pa-s) at 75° C. and a shear rate of 20 sec$^{-1}$. Preferably, the viscosity is about 5 to about 35 Pa-s. Viscosity measurements were taken with a Paar Physica MCR 500 Modular Compact Rheometer using a 5 cm, 1° Cone and Plate configuration.

The edible composition may be manipulated using any means necessary to obtain a desired shape. In one example, the edible composition may be transferred into a mold or package, forming a shaped product. In another example, the edible composition may be transferred onto a slab and cut into pieces. It is critical to transfer the finished composition at a temperature above about 45° C., and then to allow it to set up at a temperature below about 30° C. for a minimum of about 5 minutes.

The edible composition may also be incorporated as a component of other confectionery or sweetened products. For example, the edible composition may be incorporated into a dessert, a confectionery product, beverages and other confectionery snacks.

The size of the finished product is largely determined by product design requirements. In general, the indulgent edible composition will form a bite-sized product weighing about 3 to about 30 grams.

Specific embodiments of the invention will now be demonstrated by reference to the following examples. It should be understood that these examples are disclosed solely by way of illustrating the invention and variations within the spirit of the invention are anticipated.

Example 1

Inventive Milk Chocolate Flavored Composition with Fiber

The "Formulation 1" table lists the ingredients used to make an indulgent edible composition containing fiber and having a milk chocolate flavor. This product had a moisture content of 30 wt. % moisture and a water activity of 0.86.
Formulation 1:

| Ingredient class | Ingredient | Amount (g) | Wt. % wet basis | Wt. % dry basis |
|---|---|---|---|---|
| Fiber-containing component | Microcrystalline cellulose | 80 | 2.7 | 3.7 |
| Sweetener | Sugar, granulated | 660 | 21.9 | 31.3 |
| Starch | Modified tapioca starch | 30 | 1.0 | 1.4 |
| Hydrocolloid | Low-methoxyl pectin | 40 | 1.3 | 1.9 |
| Protein-containing component | Milk powder, nonfat | 148 | 4.9 | 7.0 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Flavorant | Vanilla extract | 2.5 | 0.08 | 0.12 |
| Flavorant | Cocoa powder (11 wt. % fat) | 60 | 2.0 | 2.8 |
| Sweetener | 63 DE corn syrup | 200 | 6.6 | 7.7 |
| Fat-containing component + surfactant | Milk chocolate (32 wt. % fat) with lecithin | 900 | 29.9 | 41.9 |
| Fat-containing component | Chocolate liquor (51 wt. % fat) | 40 | 1.3 | 1.9 |
| Water | Water - Initial in batch | 1100 | | |
| | Water - Final in product | 843 | 28.0 | 0.0 |
| TOTALS | | | 100.0 | 100.0 |

Procedure:

80 grams of a fiber-containing component (microcrystalline cellulose, Avicel® RC591; Supplier: FMC Biopolymers, Foods Division) was dispersed into 1100 grams of water and sheared using an IKA brand mixer (table top model with stator and motor) under high shear conditions until all of the fiber was fully dispersed into the water.

660 grams of sugar, 148 grams of nonfat milk powder, 40 grams of pectin, 30 grams of starch, and 6 grams of preservatives were added and mixed into the fiber dispersion until all the ingredients were well dispersed and the mixture was lump free, forming a mass.

The mass was then heated over a stove-top at a temperature of 80° C. to 95° C. with constant agitation so that no lumps or skinning of the mixture occurred.

When the mass reached 50° C., 1.5 grams of the surfactant was introduced to the cooking mixture with continuous agitation.

The mass was further cooked to 90-100° C. until 380 grams of water was removed from the mixture (i.e., decreasing the mass moisture content from 39 wt. % to a final value of 27 wt. % moisture).

Next, an aqueous dispersion of a chocolate flavorant system was made by mixing 60 grams of cocoa powder and 2.5 grams of vanilla extract with 200 grams of warmed (60° C.) corn syrup and 100 grams of water at 80° C. The ingredients were bar blended with a hand mixer until all ingredients were well mixed.

The aqueous flavorant dispersion was then mixed into the cooked mass until all the flavorants were fully dispersed and a homogeneous flavored mass was obtained.

Next, two fat-containing components, 900 grams of milk chocolate and 40 grams of chocolate liquor, were added to the flavored mass. The mixture was gently mixed under low shear conditions until the fat-containing components were evenly dispersed into the flavored mass. During this mixing step, the product was periodically heated on low heat to ensure that the fat-containing components and flavored mass did not set up prior to depositing the product. The temperature of the aggregate mass was maintained between 55 and 85° C. during the fat dispersion step. Note that it is critical to maintain the aggregate mass in a temperature range that is warm enough so that the mass will not prematurely set up, as well as cool enough to prevent separation of the fat phase.

Once the fat-containing components were evenly dispersed into the flavored mass, the mixture was poured to form a slab at 60° C. and allowed to set at 20° C. for 1 hour before it was cut into cubes and tasted.

Product Attributes:

An internal taste panel consisting of nine people evaluated the product flavor and texture. The panel found the flavor to be similar to milk chocolate and very indulgent. The panel also found the texture to be similar to chocolate after the product dispersed and melted in the mouth. The product possessed good fat melt perception and a creamy mouth feel.

Example 2

Inventive Dark Chocolate Flavored Composition

"Formulation 2" represents a 38.8 wt. % moisture formulation (water activity=0.91) with dark chocolate flavor.
Formulation 2:

| Ingredient Type | Ingredient | Amount (g) | Wt. % wet basis | Wt. % dry basis |
|---|---|---|---|---|
| Starch | Modified tapioca starch | 30 | 1.0 | 1.6 |
| Hydrocolloid | Low-methoxyl pectin | 70 | 2.3 | 3.8 |
| Protein-containing component | Milk powder, nonfat | 260 | 8.6 | 13.9 |
| Fat-containing component | Chocolate liquor (51 wt. % fat) | 20 | 0.7 | 1.1 |
| Flavorant | Cocoa powder (11 wt. % fat) | 70 | 2.3 | 3.7 |
| Sweetener | Sugar, granulated | 540 | 17.8 | 29.1 |
| Sweetener | 63 DE corn syrup | 200 | 6.6 | 8.8 |
| Fat-containing component + surfactant | Dark chocolate (32 wt. % fat) with lecithin | 720 | 23.7 | 38.0 |

-continued

| Ingredient Type | Ingredient | Amount (g) | Wt. % wet basis | Wt. % dry basis |
|---|---|---|---|---|
| Flavorant | Vanilla extract | 3 | 0.10 | 0.16 |
| Water | Water - Initial in batch | 1300 | | |
| | Water - Final in product | 1123 | 37.0 | 0.0 |
| TOTALS | | | 100.0 | 100.0 |

Procedure:

The edible composition was prepared as in Example 1, except that the amounts of the ingredients used were modified as indicated in the Table above and the fiber dispersion step was omitted. The sugar, nonfat milk powder, modified tapioca starch, and low-methoxyl pectin were mixed with 1300 grams of water. 200 grams of warmed (60° C.) corn syrup was added to the aqueous mixture. The mixture was heated and cooked so that no lumping or skinning occurred, and 270 grams of water was removed from the mixture to obtain a cooked mass. An aqueous dispersion of vanilla extract and cocoa powder in 100 grams of warm water was gently added to the cooked mass, and dark chocolate and chocolate liquor were added to the mass at conditions similar to Example 1.

Product Attributes:

The internal taste panel found the product to have a sweet dark chocolate-like flavor. The product had a slightly softer texture than the product of Example 1, and provided a soft and creamy melt perception during its residence time in the mouth.

Example 3

Comparative Milk Chocolate Flavored Composition with Fiber, Agar/Pectin, and High Starch Level "Formulation 3" represents a 30 wt. % moisture formulation (water activity=0.84) with a starch level higher than in products of the invention.

Formulation 3:

| Ingredient Type | Ingredient | Amount (g) | Wt. % wet basis | Wt. % dry basis |
|---|---|---|---|---|
| Starch | Modified tapioca starch | 487 | 6.1 | 8.7 |
| Hydrocolloid | Low-methoxyl pectin | 159 | 2.0 | 2.8 |
| Hydrocolloid | Agar | 178 | 2.2 | 2.9 |
| Fat-containing component | Chocolate liquor (51 wt. % fat) | 51 | 0.6 | 0.9 |
| Protein-containing component | Milk powder, nonfat | 456 | 5.7 | 8.1 |
| Fiber-containing component | Microcrystalline cellulose | 159 | 2.0 | 2.8 |
| Flavorant | Cocoa powder (11 wt. % fat) | 255 | 3.2 | 4.5 |
| Sweetener | Sugar, granulated | 1874 | 23.5 | 33.6 |
| Sweetener | 63 DE corn syrup | 520 | 6.5 | 7.6 |
| Fat-containing component + surfactant | Milk chocolate (32 wt. % fat) with lecithin | 1594 | 20.0 | 28.0 |

-continued

| Ingredient Type | Ingredient | Amount (g) | Wt. % wet basis | Wt. % dry basis |
|---|---|---|---|---|
| Flavorant | Vanilla extract | 6.4 | 0.08 | 0.11 |
| Surfactant | Polyglycerol oleate | 2 | 0.03 | 0.04 |
| Water | Water - Initial in batch | 3400 | | |
| | Water - Final in product | 2233 | 28.0 | 0.0 |
| TOTALS | | | 100.0 | 100.0 |

Procedure:

The edible composition was prepared as in Example 1, except that the amounts of the ingredients used were modified as indicated in the Table above and agar was dispersed into the water along with low-methoxyl pectin.

Product Attributes:

The internal taste panel found the product to be very pasty and thick in the mouth, with a texture that did not clear in the mouth as desired.

Example 4

Inventive Milk Chocolate Flavored Composition with Fiber and Increased Level of Hydrocolloid Gelling Agent "Formulation 4" represents a 30.3 wt. % moisture formulation (water activity=0.86) with a hydrocolloid (pectin) level higher than in Example 1 but still within the desired range for products of the invention.

Formulation 4:

| Ingredient Class | Ingredient | Amount (g) | Wt. % wet basis | Wt. % dry basis |
|---|---|---|---|---|
| Starch | Modified tapioca starch | 30 | 1.2 | 1.7 |
| Hydrocolloid | Low-methoxyl pectin | 50 | 1.9 | 2.8 |
| Fat-containing component | Chocolate liquor (51 wt. % fat) | 40 | 1.5 | 2.2 |
| Protein-containing component | Milk powder, nonfat | 148 | 5.7 | 8.1 |
| Fiber-containing component | Microcrystalline cellulose | 70 | 2.7 | 3.8 |
| Flavorant | Cocoa powder (11 wt. % fat) | 60 | 2.3 | 3.3 |
| Sweetener | Sugar, granulated | 360 | 13.9 | 19.9 |
| Sweetener | 63 DE corn syrup | 200 | 7.7 | 9.0 |
| Fat-containing component + surfactant | Milk chocolate (32 wt. % fat) with lecithin | 900 | 34.7 | 48.8 |
| Flavorant | Vanilla extract | 2.5 | 0.10 | 0.14 |
| Preservative | Potassium sorbate | 3 | 0.12 | 0.17 |
| Preservative | Sodium benzoate | 3 | 0.12 | 0.16 |
| Surfactant | Polyglycerol oleate | 1.5 | 0.06 | 0.08 |
| Water | Water - Initial in batch | 1180 | | |
| | Water - Final in product | 726 | 28.0 | 0.0 |
| TOTALS | | | 100.0 | 100.0 |

Procedure:

The edible composition was prepared as in Example 1, except that the amounts of the ingredients used were modified as indicated in the Table above. This formulation had an acceptable texture, which was firmer than that of the Example 1 product. The product set up in a shaped format well.

Product Attributes:

The product was described by the internal taste panel as having good chocolate flavor and fat melt perception, as well as a firm texture.

Example 5

Inventive Milk Chocolate Flavored Composition with Fiber and Carageenan

"Formulation 5" represents a 39.4 wt. % moisture formulation (water activity=0.86) using carageenan as the hydrocolloid gelling agent.

Formulation 5:

| Ingredient Class | Ingredient | Amount (g) | Wt. % wet basis | Wt. % dry basis |
|---|---|---|---|---|
| Starch | Modified tapioca starch | 30 | 0.9 | 1.4 |
| Hydrocolloid | Carageenan | 12 | 0.4 | 0.6 |
| Fat-containing component | Chocolate liquor (51 wt. % fat) | 40 | 1.2 | 1.9 |
| Protein-containing component | Milk powder, nonfat | 148 | 4.3 | 7.1 |
| Fiber-containing component | Microcrystalline cellulose | 70 | 2.0 | 3.3 |
| Flavorant | Cocoa powder (11 wt. % fat) | 60 | 1.8 | 2.8 |
| Sweetener | Sugar, granulated | 660 | 19.3 | 31.9 |
| Sweetener | 63 DE corn syrup | 200 | 5.9 | 7.9 |
| Fat-containing component + surfactant | Milk chocolate (32 wt. % fat) with lecithin | 900 | 26.3 | 42.6 |
| Flavorant | Vanilla extract | 2.5 | 0.07 | 0.12 |
| Preservative | Potassium sorbate | 3 | 0.09 | 0.14 |
| Preservative | Sodium benzoate | 3 | 0.09 | 0.14 |
| Surfactant | Polyglycerol oleate | 1.5 | 0.04 | 0.07 |
| Water | Water - Initial in batch | 2600 | | |
| | Water - Final in product | 1287 | 37.7 | 0.0 |
| TOTALS | | | 100.0 | 100.0 |

Procedure:

The edible composition was prepared as in Example 1, except that the amounts of the ingredients used were modified as indicated in the Table above. The product was softer than in Example 4, but also set up well as a solid matrix.

Product Attributes:

The internal taste panel described the product as slightly softer and quicker in providing fat melt perception than the product of Example 4. The product had good chocolate flavor and sweetness that lasted through the entire residence time in the mouth.

Example 6

Comparative Milk Chocolate Flavored Composition with Fiber and Low Starch

"Formulation 6" represents a 30 wt. % moisture formulation (water activity=0.86) with a lower level of starch than is desirable in the products of the invention.

Formulation 6:

| Ingredient Class | Ingredient | Amount (g) | Wt. % wet basis | Wt. % dry basis |
|---|---|---|---|---|
| Starch | Modified tapioca starch | 8 | 0.3 | 0.4 |
| Hydrocolloid | Low-methoxyl pectin | 50 | 1.7 | 2.4 |
| Fiber-containing component | Microcrystalline cellulose | 70 | 2.3 | 3.3 |
| Fat-containing component | Chocolate liquor (51 wt. % fat) | 40 | 1.3 | 1.9 |
| Protein-containing component | Milk powder, nonfat | 148 | 5.0 | 7.0 |
| Flavorant | Cocoa powder (11 wt. % fat) | 60 | 2.0 | 2.8 |
| Sweetener | Sugar, granulated | 660 | 22.1 | 31.6 |
| Sweetener | 63 DE corn syrup | 200 | 6.7 | 7.8 |
| Fat-containing component + surfactant | Milk chocolate (32 wt. % fat) with lecithin | 900 | 30.2 | 42.3 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Water | Water - Initial in batch | 1180 | | |
| | Water - Final in product | 834 | 28.0 | 0.0 |
| TOTALS | | | 100.0 | 100.0 |

Procedure:

The product was prepared as in Example 1, except that the amounts of the ingredients used were modified as indicated in the Table above and a lower amount of starch was used in the formulation. The product was stored in cups because the product could not be slabbed out due to its very low viscosity.

Product Attributes:

According to the internal taste panel, the product was too soft and pudding-like and cleared too quickly in the mouth. Its chocolate aftertaste was not as intense as that of the product of Example 1.

Example 7

Inventive Milk Chocolate Flavored Composition with Fiber and Specific Surfactant "Formulation 7" represents a 30 wt. % moisture formulation (water activity=0.85). The surfactant, MYVATEX™ P14K (generic name: mono- and diglycerides), was incorporated into half of the Example 7 batch.

Formulation 7:

| Ingredient Class | Ingredient | Amount (g) | Wt. % wet basis | Wt. % dry basis |
|---|---|---|---|---|
| Starch | Modified tapioca starch | 50 | 1.6 | 2.3 |
| Hydrocolloid | Low-methoxyl pectin | 40 | 1.3 | 1.9 |
| Fiber-containing component | Microcrystalline cellulose | 70 | 2.3 | 3.2 |
| Fat-containing component | Chocolate liquor (51 wt. % fat) | 50 | 1.6 | 2.3 |
| Protein-containing component | Milk powder, nonfat | 148 | 4.9 | 6.9 |
| Flavorant | Cocoa powder (11 wt. % fat) | 60 | 2.0 | 2.8 |

-continued

| Ingredient Class | Ingredient | Amount (g) | Wt. % wet basis | Wt. % dry basis |
|---|---|---|---|---|
| Sweetener | Sugar, granulated | 660 | 21.7 | 31.0 |
| Sweetener | 63 DE corn syrup | 200 | 6.6 | 7.7 |
| Fat-containing component + surfactant | Milk chocolate (32 wt. % fat) with lecithin | 900 | 29.6 | 41.4 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Mono- and diglycerides blend | 2 | 0.07 | 0.09 |
| Surfactant | Polyglycerol oleate | 1.5 | 0.05 | 0.07 |
| Water | Water - Initial in batch | 1245 | | |
| | Water - Final in product | 852 | 28.0 | 0.0 |
| TOTALS | | | 100.0 | 100.0 |

Procedure:

The edible composition was prepared as in Example 1, except that the amounts of the ingredients used were modified as indicated in the Table above, and the surfactant mono- and diglycerides blend (Brand name, MYVATEX™ P14K) was stirred in to half the batch of finished product while still hot (between 70° C. and 72° C.) and the product was allowed to set.

Product Attributes:

According to the internal taste panel, the addition of mono- and diglycerides enhanced the fat mouthfeel and creaminess of the product compared to the portion of the batch without the addition of the surfactant.

Example 8

Comparative Milk Chocolate Flavored Composition with Fiber and without Hydrocolloid Gelling Agent "Formulation 8" represents a 30 wt. % moisture formulation (water activity=0.87) with fiber and no hydrocolloid gelling agent in the formulation.

Formulation 8:

| Ingredient Class | Ingredient | Amount (g) | Wt. % wet basis | Wt. % dry basis |
|---|---|---|---|---|
| Starch | Modified tapioca starch | 60 | 2.0 | 2.8 |
| Fiber-containing component | Microcrystalline cellulose | 70 | 2.3 | 3.2 |
| Fat-containing component | Chocolate liquor (51 wt. % fat) | 50 | 1.7 | 2.4 |
| Protein-containing component | Milk powder, nonfat | 148 | 4.9 | 7.0 |
| Flavorant | Cocoa powder (11 wt. % fat) | 60 | 2.0 | 2.8 |
| Sweetener | Sugar, granulated | 660 | 22.0 | 31.5 |
| Sweetener | 63 DE corn syrup | 200 | 6.7 | 7.8 |
| Fat-containing component + surfactant | Milk chocolate (32 wt. % fat) with lecithin | 900 | 30.0 | 42.1 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Water | Water - Initial in batch | 2200 | | |
| | Water - Final in product | 839 | 28.0 | 0.0 |
| TOTALS | | | 100.0 | 100.0 |

Procedure:

The edible composition was prepared as in Example 1, except that the amounts of the ingredients used were modified as indicated in the Table above and no hydrocolloid gelling agent was included in the formulation.

Product Attributes:

The product had an unacceptable texture as evaluated by the internal taste panel. The finished product lacked physical structure, was very sticky, and had a clay-like eating quality of a very thick toothpaste.

Example 9

Comparative Milk Chocolate Flavored Composition with Fiber and High Hydrocolloid Gelling Agent "Formulation 9" represents a 29.9 wt. % moisture formulation (water activity=0.86) with a higher level of hydrocolloid gelling agent than is desired in the products of the invention.

Formulation 9:

| Ingredient Class | Ingredient | Amount (g) | Wt. % wet basis | Wt. % dry basis |
|---|---|---|---|---|
| Starch | Modified tapioca starch | 30 | 1.0 | 1.4 |
| Hydrocolloid | Low-methoxyl pectin | 100 | 3.2 | 4.6 |
| Fiber-containing component | Microcrystalline cellulose | 70 | 2.3 | 3.1 |
| Fat-containing component | Chocolate liquor (51 wt. % fat) | 50 | 1.6 | 2.3 |
| Protein-containing component | Milk powder, nonfat | 148 | 4.8 | 6.8 |
| Flavorant | Cocoa powder (11 wt. % fat) | 60 | 1.9 | 2.7 |
| Sweetener | Sugar, granulated | 660 | 21.3 | 30.4 |
| Sweetener | 63 DE corn syrup | 200 | 6.5 | 7.5 |
| Fat-containing component + surfactant | Milk chocolate (32 wt. % fat) with lecithin | 900 | 29.1 | 40.7 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Water | Water - Initial in batch | 2100 | | |
| | Water - Final in product | 866 | 28.0 | 0.0 |
| TOTALS | | | 100.0 | 100.0 |

Procedures:

The edible composition was prepared as in Example 1, except that the amounts of the ingredients used were modified as indicated in the Table above and the level of hydrocolloid gelling agent was increased. The finished product was setting up as it was poured at 55° C.

Product Attributes:

The internal taste panel found the product too elastic and firm to eat, and not acceptable as an indulgent snack. Sweetness and chocolate flavor took too long to be released during eating.

Example 10

Inventive Milk Chocolate Flavored Composition with Fiber in Form of Microcrystalline Cellulose and Polydextrose "Formulation 10" represents a 32.5 wt. % moisture formulation (water activity=0.89) using polydextrose as a fiber-containing component along with microcrystalline cellulose and a decreased level of sucrose compared to Example 1.

Formulation 10:

| Ingredient Class | Ingredient | Amount (g) | Wt. % wet basis | Wt. % dry basis |
|---|---|---|---|---|
| Starch | Modified tapioca starch | 30 | 1.0 | 1.4 |
| Hydrocolloid | Low-methoxyl pectin | 40 | 1.3 | 1.9 |
| Fiber-containing component | Microcrystalline cellulose | 80 | 2.6 | 3.7 |
| Fat-containing component | Chocolate liquor (51 wt. % fat) | 40 | 1.3 | 1.9 |
| Protein-containing component | Milk powder, nonfat | 148 | 4.7 | 7.0 |
| Fiber-containing component | Polydextrose | 270 | 8.6 | 9.0 |
| Flavorant | Cocoa powder (11 wt. % fat) | 60 | 1.9 | 2.8 |
| Sweetener | Sugar, granulated | 471 | 15.1 | 22.4 |
| Sweetener | 63 DE corn syrup | 200 | 6.4 | 7.7 |
| Fat-containing component + surfactant | Milk chocolate (32 wt. % fat) with lecithin | 900 | 28.8 | 41.9 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Water | Water - Initial in batch | 1820 | | |
| | Water - Final in product | 875 | 28.0 | 0.0 |
| TOTALS | | | 100.0 | 100.0 |

Procedure:

The edible composition was prepared as in Example 1, except that the amounts of the ingredients used were modified as indicated in the Table above and the polydextrose was added as a fiber-containing component along with microcrystalline cellulose.

Product Attributes:

The internal taste panel described the product as having good chocolate flavor and texture with less sweetness than the product of Example 1.

Example 11

Inventive Milk Chocolate Flavored Composition with Fiber and Agar as Hydrocolloid Gelling Agent "Formulation 11" represents a 30.1 wt. % moisture formulation (water activity=0.86) in which low-methoxyl pectin was replaced with agar.

Formulation 11:

| Ingredient Class | Ingredient | Amount (g) | Wt. % wet basis | Wt. % dry basis |
|---|---|---|---|---|
| Starch | Modified tapioca starch | 30 | 1.0 | 1.4 |
| Hydrocolloid | Agar | 50 | 1.7 | 2.2 |
| Fiber-containing component | Microcrystalline cellulose | 80 | 2.6 | 3.7 |
| Fat-containing component | Chocolate liquor (51 wt. % fat) | 40 | 1.3 | 1.9 |
| Protein-containing component | Milk powder, nonfat | 148 | 4.9 | 6.9 |
| Flavorant | Cocoa powder (11 wt. % fat) | 60 | 2.0 | 2.8 |
| Sweetener | Sugar, granulated | 660 | 21.8 | 31.2 |
| Sweetener | 63 DE corn syrup | 200 | 6.6 | 7.7 |
| Fat-containing component + surfactant | Milk chocolate (32 wt. % fat) with lecithin | 900 | 29.8 | 41.7 |
| Flavorant | Vanilla extract | 2.5 | 0.08 | 0.12 |
| Preservative | Potassium sorbate | 3 | 0.10 | 0.14 |
| Preservative | Sodium benzoate | 3 | 0.10 | 0.14 |
| Surfactant | Polyglycerol oleate | 1.5 | 0.05 | 0.07 |
| Water | Water - Initial in batch | 1245 | | |
| | Water - Final in product | 846 | 28.0 | 0.0 |
| TOTALS | | | 100.0 | 100.0 |

Procedure:

The edible composition was prepared as in Example 1, except that the amounts of the ingredients used were modified as indicated in the Table above and agar was substituted for pectin as the hydrocolloid gelling agent.

Product Attributes:

The internal taste panel reported that the finished product had a more firm bite than the product of Example 1 initially, then broke down to a smooth and creamy texture in the mouth fairly quickly.

Example 12

Inventive Milk Chocolate Mocha Flavored Composition with Fiber

"Formulation 12" represents a 30.2 wt. % moisture formulation (water activity=0.88) with a mocha flavor.

Formulation 12:

| Ingredient Class | Ingredient | Amount (g) | Wt. % wet basis | Wt. % dry basis |
|---|---|---|---|---|
| Starch | Modified tapioca starch | 30 | 1.1 | 1.5 |
| Hydrocolloid | Low-methoxyl pectin | 40 | 1.4 | 2.0 |
| Fiber-containing component | Microcrystalline cellulose | 80 | 2.8 | 3.9 |
| Fat-containing component | Chocolate liquor (51 wt. % fat) | 40 | 1.4 | 2.0 |
| Protein-containing component | Milk powder, nonfat | 148 | 5.3 | 7.4 |
| Flavorant | Folgers ® Brand instant coffee crystals | 40 | 1.4 | 2.0 |
| Sweetener | Sugar, granulated | 540 | 19.2 | 27.4 |
| Sweetener | 63 DE corn syrup | 200 | 7.1 | 8.3 |

-continued

| Ingredient Class | Ingredient | Amount (g) | Wt. % wet basis | Wt. % dry basis |
|---|---|---|---|---|
| Fat-containing component + surfactant | Milk chocolate (32 wt. % fat) with lecithin | 900 | 31.9 | 44.8 |
| Flavorant | Vanilla extract | 2.5 | 0.09 | 0.13 |
| Preservative | Potassium sorbate | 3 | 0.11 | 0.15 |
| Preservative | Sodium benzoate | 3 | 0.11 | 0.15 |
| Surfactant | Polyglycerol oleate | 1.5 | 0.05 | 0.08 |
| Water | Water - Initial in batch | 1080 | | |
| | Water - Final in product | 789 | 28.0 | 0.0 |
| TOTALS | | | 100.0 | 100.0 |

Procedure:

The edible composition was prepared as in Example 1, except that the amounts of the ingredients used were modified as indicated in the Table above and instant coffee crystals were blended into the water in place of the cocoa powder in the aqueous flavorant dispersion of Example 1.

Product Attributes:

The internal taste panel judged the product to have a good texture and creamy mouth feel, as well as a good mocha flavor that provided a pleasant eating experience.

Example 13

Inventive Caramel Flavored Composition with Fiber

"Formulation 13" represents a 28.3 wt. % moisture formulation (water activity=0.84) made with whey protein isolate, caramelized sugar, anhydrous milk fat, and vegetable oil to deliver a caramel flavor.

Formulation 13:

| Ingredient Class | Ingredient | Amount (g) | Wt. % wet basis | Wt. % dry basis |
|---|---|---|---|---|
| Starch | Modified tapioca starch | 25 | 2.0 | 2.8 |
| Hydrocolloid | Low-methoxyl pectin | 25 | 2.0 | 2.8 |
| Fiber-containing component | Microcrystalline cellulose | 25 | 2.0 | 2.7 |
| Protein-containing component | Whey protein isolate | 40 | 3.2 | 4.2 |
| Protein-containing component | Milk powder, nonfat | 200 | 15.9 | 21.9 |
| Fat-containing component | Anhydrous milk fat (100 wt. % fat) | 50 | 4.0 | 5.5 |
| Sweetener | Sugar, granulated | 185 | 14.7 | 20.5 |
| Sweetener | Caramelized sugar | 100 | 7.9 | 11.1 |
| Fat-containing component | Vegetable oil (100 wt. % fat) | 250 | 19.8 | 27.7 |
| Flavorant | Vanilla extract | 2.5 | 0.20 | 0.28 |
| Preservative | Potassium sorbate | 3.5 | 0.28 | 0.39 |
| Surfactant | Polyglycerol oleate | 1.5 | 0.12 | 0.17 |
| Water | Water - Initial in batch | 620 | | |
| | Water - Final in product | 352 | 27.9 | 0.0 |
| TOTALS | | | 100.0 | 100.0 |

Procedure:

The edible composition was prepared as in Example 1, except that the amounts of the ingredients used were modified as indicated in the Table above and vegetable oil (Canola) and anhydrous milk fat replaced chocolate and chocolate liquor as the fat-containing components, and caramel flavor was delivered through incorporation of caramelized sugar.

Product Attributes:

The caramel flavored product was described by the internal taste panel as having a good caramel flavor and a very creamy texture in the mouth.

Example 14

Comparative Chocolate Flavored Composition with Fiber and Low Fat-Containing Component "Formulation 14" represents a 28.8 wt. % moisture formulation (water activity=0.83) made with a lower level of fat-containing component than is desirable in the products of the invention.

Formulation 14:

| Ingredient Class | Ingredient | Amount (g) | Wt. % wet basis | Wt. % dry basis |
|---|---|---|---|---|
| Starch | Modified tapioca starch | 25 | 2.7 | 3.7 |
| Hydrocolloid | Low-methoxyl pectin | 25 | 2.7 | 3.7 |
| Fiber-containing component | Microcrystalline cellulose | 25 | 2.7 | 3.6 |
| Protein-containing component | Whey protein isolate | 40 | 4.2 | 5.7 |
| Protein-containing component | Milk powder, nonfat | 200 | 21.2 | 29.5 |
| Fat-containing component | Anhydrous milk fat (100 wt. % fat) | 10 | 1.1 | 1.5 |
| Sweetener | Sugar, granulated | 185 | 19.6 | 27.6 |
| Fat-containing component | Chocolate liquor (51 wt. % fat) | 100 | 10.6 | 14.8 |
| Flavorant | Vanilla extract | 2.5 | 0.27 | 0.37 |
| Preservative | Potassium sorbate | 3.5 | 0.37 | 0.52 |
| Surfactant | Polyglycerol oleate | 1.5 | 0.16 | 0.22 |
| Flavorant | Cocoa powder (11 wt. % fat) | 60 | 6.4 | 8.8 |
| Water | Water - Initial in batch | 600 | | |
| | Water - Final in product | 264 | 28.0 | 0.0 |
| TOTALS | | | 100.0 | 100.0 |

Procedure:

The edible composition was prepared as in Example 1, except that the amounts of the ingredients used were modified as indicated in the Table above and a lower amount of fat-containing component was used in the formulation.

Product Attributes:

According to the internal taste panel, this product did not provide an indulgent eating experience. The product was more like a chocolate or cocoa flavored toffee than a chocolate. The product did not clear quickly from the mouth and lacked the desired level of fat melt mimic.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method of preparing an indulgent edible composition comprising the steps of:
   a) mixing a hydrocolloid gelling agent, a starch, a protein-containing component, and water at a temperature of about 5° C. to about 80° C., thereby forming a premix;
   b) heating said premix and cooking at a temperature of about 60° C. to about 100° C., thereby forming a cooked mass having a total solids content of about 38.15% to about 73.40% by weight; and
   adding a surfactant and a fat-containing component to said cooked mass and mixing at low shear and a temperature of about 50° C. to about 85° C. until said fat-containing component is well incorporated into said cooked mass; and thereby forming said edible composition,
   wherein said starch when combined with water in a weight ratio of 5:95 starch to water, has a viscosity at 22° C. of about 0.03 Pa-s to about 2 Pa-s at a shear rate of 10 sec$^{-1}$;
   said protein-containing component substantially hydrates in water and will not coagulate;
   a sweetener is added in at least one of steps (a), (b) or (c) and said sweetener when substantially hydrated is at least 90% free of crystals in said edible composition;
   said fat-containing component melts at a temperature of about 45° C. or less;
   said hydrocolloid gelling agent facilitates the formation of a gel matrix that will break down at a temperature of about 45° C. or less; and
   said edible surfactant is food grade and has a HLB value of about 0 to about 12.

2. The method of claim 1, further comprising the step of shaping said edible composition.

3. The method of claim 2, wherein said shaping step involves transferring said edible composition into a mold or package.

4. The method of claim 2, wherein said shaping step involves transferring said edible composition onto a slab and cutting the slab into pieces to set the shape of said edible composition.

5. The method of claim 1, wherein a fiber dispersion is formed by shearing a fiber-containing component into water until the fiber is dispersed in the water, and then mixing said fiber dispersion with said hydrocolloid gelling agent, said sweetener, said starch, said protein-containing component, and said water, thereby forming said premix in step (a).

6. The method of claim 1, wherein said edible surfactant, said fat-containing component, and said cooked mass are heated at about 65° C. to about 100° C. while mixing at low shear when said fat-containing component comprises solid fat.

7. The method of claim 1, wherein an excess amount of water is added and mixed with said premix to a level from about 16 wt. % to about 80 wt. % moisture, and the premix is then heated to achieve a total solids content of about 50 to about 73.40% by weight solids.

8. The method of claim 1, wherein said hydrocolloid gelling agent is a low-methoxyl pectin.

9. The method of claim 1, wherein said sweetener is added in step (a) and is sucrose.

10. The method of claim 1, wherein said premix formed in step (a) further comprises corn syrup when said sweetener is sucrose.

11. The method of claim 1, wherein said protein-containing component is a dairy protein.

12. The method of claim 1, wherein said premix is heated to a temperature in step (b) in a range of about 75° C. to about 100° C.

13. The method of claim 1, wherein said fat-containing component is selected from one or more of the group consisting of chocolate, cocoa butter, chocolate crumb, cocoa butter alternative, cocoa butter equivalent, cocoa butter extender, cocoa butter replacer, cocoa butter substitute, milk fat, cocoa solids, chocolate liquor, compound coating, olestra, vegetable oil, fractionated fat, and mixtures thereof.

14. The method of claim 1, wherein said edible composition has about 27% to about 50% by weight moisture and a water activity of less than about 0.78-0.92.

15. The method of claim 1, wherein said edible composition has a viscosity at 75° C. of about 5 Pa-s to about 40 Pa-s at a shear rate of 20 sec$^{-1}$.

16. The method of claim 1, wherein said edible composition has a caloric density of less than about 5 kilocalories per gram.

17. The method of claim 16, wherein said edible composition has a caloric density in a range of about 2.2 to about 4.5 kilocalories per gram.

18. An indulgent chocolate-tasting edible composition prepared according to the method of claim 1.

19. A method of preparing an indulgent edible composition comprising the steps of:
   a) forming a slurry with an excess amount of water by shearing a fiber-containing component into water in a weight ratio of greater than 10:1 water to fiber until the fiber is dispersed into the water;
   b) mixing a starch, a protein-containing component and a hydrocolloid gelling agent with the slurry containing excess water at a temperature of about 5° C. to about 80° C. until the slurry, the starch, the protein-containing component and the hydrocolloid gelling agent are uniformly distributed to form a mass;
   c) heating and cooking the mass at a temperature of about 60° C. to about 100° C. to remove the excess water, thereby forming a cooked mass having a total solids content of about 38.15% to about 73.40% by weight; and
   d) mixing a fat-containing component and a surfactant with the cooked mass at low shear and a temperature of about 50° C. to about 85° C., thereby forming said indulgent edible composition,
   wherein said starch when combined with water in a weight ratio of 5:95 starch to water, has a viscosity at 22° C. of about 0.03 Pa-s to about 2 Pa-s at a shear rate of 10 sec$^{-1}$;
   said protein-containing component substantially hydrates in water and will not coagulate;
   a sweetener is added in at least one of steps (b), (c) or (d) and said sweetener when substantially hydrated is at least 90% free of crystals in said edible composition;
   said fat-containing component melts at a temperature of about 45° C. or less;
   said hydrocolloid gelling agent facilitates the formation of a gel matrix that will break down at a temperature of about 45° C. or less; and
   said edible surfactant is food grade and has a HLB value of about 0 to about 12.

20. The method of claim 19, wherein said slurry in step (a) further comprises a fiber and water mixture formed by mixing a fiber-containing component and water to a smooth consistency.

21. The method of claim 19, wherein water is added and mixed with said slurry and the slurry is heated to achieve a total solids content of about 60% to about 75% by weight solids.

22. The method of claim 19, further comprising the step of shaping said edible composition.

23. The method of claim 22, wherein said shaping step involves transferring said edible composition into a mold or package.

24. The method of claim 22, wherein said shaping step involves transferring said edible composition onto a slab and cutting the slab into pieces to set the shape of said edible composition.

25. A method of preparing an indulgent edible composition comprising the steps of:
   a) mixing a hydrocolloid gelling agent, a starch, a protein-containing component, and water at a temperature of about 5° C. to about 80° C., thereby forming a premix;
   b) heating said premix and cooking in a pressured cooking system at a temperature greater than about 100° C., thereby forming a cooked mass having a total solids content of about 38.15% to about 73.40% by weight; and
   adding a surfactant and a fat-containing component to said cooked mass and mixing at low shear and a temperature of about 50° C. to about 85° C. until said fat-containing component is well incorporated into said cooked mass; and thereby forming said edible composition, wherein said starch when combined with water in a weight ratio of 5:95 starch to water, has a viscosity at 22° C. of about 0.03 Pa-s to about 2 Pa-s at a shear rate of 10 sec$^{-1}$;

said protein-containing component substantially hydrates in water and will not coagulate;

a sweetener is added in at least one of steps (a), (b) or (c) and said sweetener when substantially hydrated is at least 90% free of crystals in said edible composition;

said fat-containing component melts at a temperature of about 45° C. or less;

said hydrocolloid gelling agent facilitates the formation of a gel matrix that will break down at a temperature of about 45° C. or less; and said edible surfactant is food grade and has a HLB value of about 0 to about 12.

* * * * *